D. F. CHAMBERS.
ROLLER BEARING.
APPLICATION FILED OCT. 15, 1910.

1,011,029.

Patented Dec. 5, 1911.
2 SHEETS—SHEET 1.

D. F. CHAMBERS.
ROLLER BEARING.
APPLICATION FILED OCT. 15, 1910.

1,011,029.

Patented Dec. 5, 1911.

2 SHEETS—SHEET 2.

Witnesses
Donald H. Stewart
E. V. Webster

Inventor
David F. Chambers
By Dowell & Dowell
his Attorney

UNITED STATES PATENT OFFICE.

DAVID FRANKLIN CHAMBERS, OF LANCASTER, PENNSYLVANIA, ASSIGNOR TO THE STAR BALL RETAINER COMPANY, OF LANCASTER, PENNSYLVANIA, A CORPORATION OF NEW JERSEY.

ROLLER-BEARING.

1,011,029.  Specification of Letters Patent.  Patented Dec. 5, 1911.

Application filed October 15, 1910. Serial No. 587,199.

*To all whom it may concern:*

Be it known that I, DAVID F. CHAMBERS, a citizen of the United States, residing at Lancaster, in the county of Lancaster and State of Pennsylvania, have invented certain new and useful Improvements in Roller-Bearings, of which the following is a specification.

This invention relates to anti-friction bearings, and more particularly to that class of bearings in which a circular series of rollers are confined in separated relation in a retaining device or cage placed between concentric bearing surfaces for sustaining radial pressure and reducing friction.

The objects of the invention are to provide an improved unit-structure roller-bearing and an improved retaining device or cage for holding a circular series of rollers in separated relation while permitting free rotation and without liability of permitting the rollers to escape or drop out when the cage is removed from the bearing surfaces between which it is designed to be used.

A further object is to provide a cage of the character referred to which shall be simple and strong in construction and efficient and durable in practical use.

The invention will first be hereinafter more particularly described with reference to the accompanying drawings, which form a part of this specification, and then pointed out in the claims at the end of the description.

Figure 1:
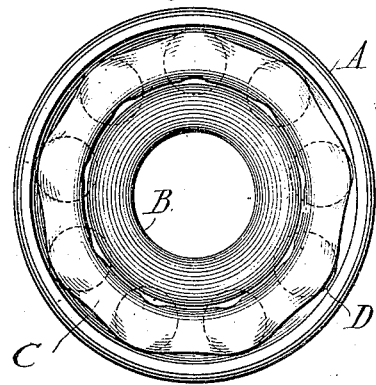
Figure 2:
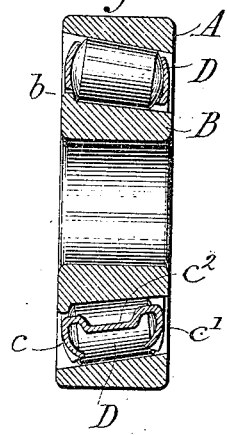
Figure 3:
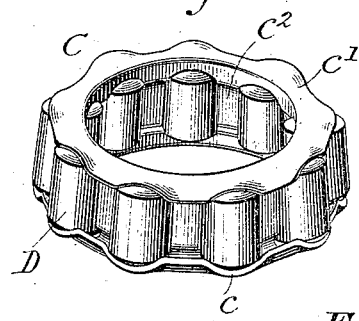
Figure 4:
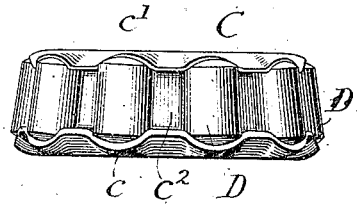
Figure 5:
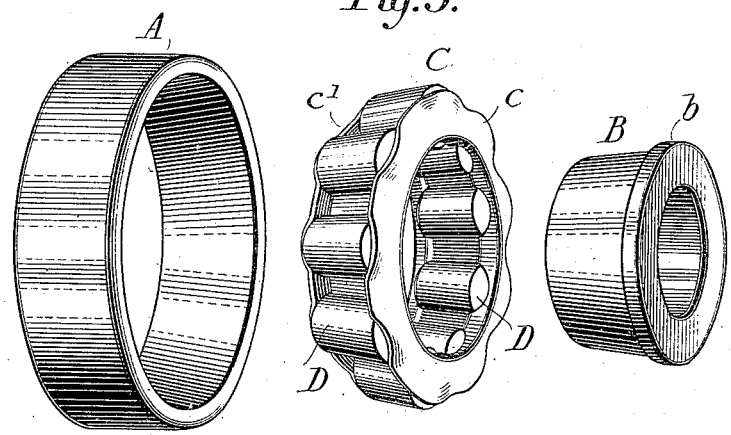
Figure 6:
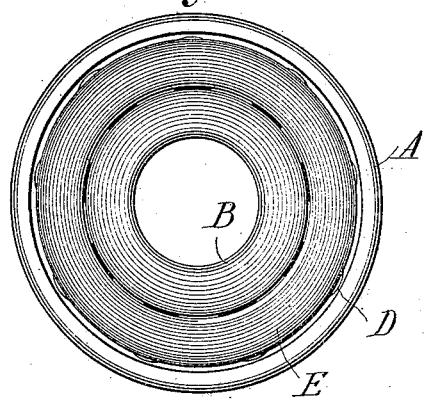
Figure 7:
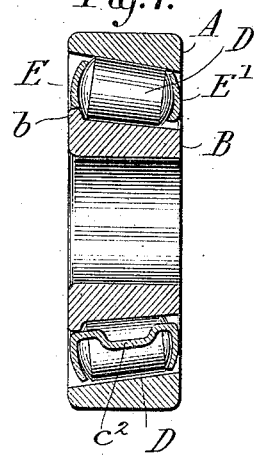
Figure 8:
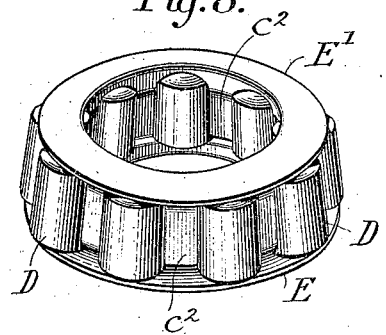
Figure 9:
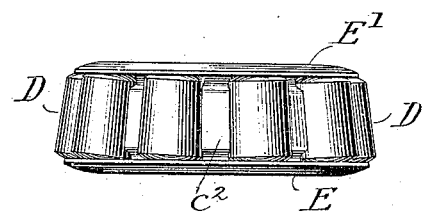
Figure 10:
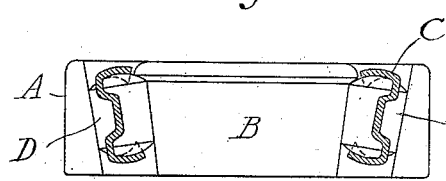
Figure 11:
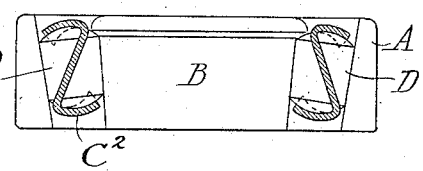

Figure 1 of the said drawings represents a side elevation of a roller bearing embodying my invention; Fig. 2 is a transverse sectional view of the same; Figs. 3 and 4 represent a perspective view and an end view, respectively, of a roller-cage embodying a preferred form of my invention; Fig. 5 represents a perspective view of the several parts of the bearing detached and arranged in position for assembling; Fig. 6 represents a side elevation of a modified form of roller bearing embodying my invention; Fig. 7 is a transverse sectional view of said modification; Figs. 8 and 9 represent a perspective view and an end view, respectively, of a modified form of roller-cage embodying my invention; and Figs. 10 and 11 are diagrammatic representations of other modifications.

Referring to said drawings, in which the same reference letters are used to denote corresponding parts in different views, the letter A denotes an outer bearing ring or cup of conical form, having its inner bearing surface inclined from side to side of the ring.

The letter B denotes an inner bearing ring or cone having its outer bearing surface or periphery inclined in the same direction, so that the walls of the annular space between the two bearing surfaces converge toward one side of the rings. The cone B has a marginal rib or flange $b$ at one end against which the ends of the rollers D may abut, to prevent endwise movement of the rollers in one direction, movement in the opposite direction being prevented by the inclined bearing surface of the outer ring.

The letter C denotes an annular roller retaining and separating device or cage of conical form which is composed of corrugated circular plates $c$ and $c^1$ having integral spaced partitions $c^2$ connecting opposite marginal portions of the two plates and preferably having their intermediate portions set in from the edges or periphery of the plate, so as to extend substantially parallel with the axes of the rollers along a median line and at an angle to the axis of the bearing. The plates $c$ and $c^1$ are of different sizes, and together with their connecting partitions form a substantially conical structure adapted to confine between the two plates a circular series of conical rollers which are separated and kept apart by the partitions $c^2$, so that the rollers cannot escape when the device is removed from the bearings.

In the form shown, the alternating ridges and furrows or concavities of the corrugations extend across from the peripheries to the inner edges of the plates, which have an abrupt inward turn or curve along the inner margins and a gradual curve or slope therefrom toward their peripheries which overhang the ends of the rollers. The partitions are integral with the ridges of the corrugations, while the furrows or concavities are located between the partitions and provide substantially concave seats for the ends of the rollers D, which preferably have convex or slightly rounded ends adapted to fit snugly within the correspondingly shaped furrows or concavities. This construction possesses great strength, and adapts the metal of the ring to closely hug and confine without binding the convex end of the roller on all sides, thus preventing the rollers from canting and insuring their retention in proper position when in use as well as when removed from the bearings.

The retaining device may be struck up out of sheet metal, preferably steel tubing, by cutting and pressing a suitable blank into the desired shape, the rollers being inserted before the final "setting" or bending inwardly of the outer margin of one of the plates, or both, if desired. It will be understood, of course, that the form or contour of the side plates and partitions connecting the same may be varied to a greater or less extent without departing from the spirit and scope of my invention. For example, I have shown several modifications in sheet 2 of the drawings.

A more simple construction than that described and one that is somewhat less expensive to manufacture is illustrated in Figs. 6 to 9 of the drawings. In this form the side plates E and E¹ have an abrupt inward turn or curve along their inner margins and a gradual curve or slope outwardly therefrom so that their confronting surfaces are substantially concave in cross-section but without corrugations, and are connected by spaced partitions $c^2$ of the same form and adapted to perform the same function as the corresponding partitions of the corrugated plates. This simple form is applicable to similar uses, and desirable for some purposes, but the corrugated form possesses greater strength and durability, and is less liable to enable a roller to cant or escape under severe strain when the conditions are such that escape is possible.

In Fig. 10 of the drawings, I have shown, diagrammatically, the assembled parts of a bearing in all material respects the same as that illustrated in Figs. 1 to 5, except that the intermediate portions of the partitions connecting the side plates (a cross-section of which is shown in full lines, and denoted by the letter C¹), extend inwardly from the outer edges or margins of the plates instead of outwardly from the inner edges thereof, as shown in Figs. 1 to 5.

In Fig. 11 of the drawings, is shown, diagrammatically, another modification, in which the partitions extend diagonally at an angle to the axes of the rollers, from the outer edge of one plate to the inner edge of the opposite plate.

Having thus described my invention, what I claim as new and desire to secure by Letters Patent is:

1. A conical roller bearing comprising a circular series of conical rollers, and a cage consisting of corrugated circular plates having the furrows of the corrugations facing and confining the ends of the rollers, said plates having integral spaced partitions spanning the intervening space at an angle to the axis of the bearing and separating the adjacent rollers throughout the bearing.

2. A conical roller bearing comprising a circular series of conical rollers, and a cage consisting of corrugated circular plates of different sizes between which the rollers are placed with their ends seated in the concavities or furrows of the corrugations, and rigid spaced partitions connecting said plates marginally between and serving as separators for the rollers throughout the bearing.

3. A conical roller bearing comprising a circular series of conical rollers, and a cage consisting of corrugated circular plates and intervening spaced partitions corresponding in number to the spaces between the rollers and extending through said spaces to separate the adjacent rollers throughout the bearing, the latter having rounded ends seated in the furrows of the corrugations, whereby the rollers are confined in separated relation without preventing free rotation.

4. An annular roller bearing comprising a circular series of rollers and a cage consisting of corrugated circular plates of different sizes having the furrows of the corrugations facing the ends of the rollers, and spaced partitions between all adjacent rollers marginally connecting said plates at an angle to the axis of the bearing and having their intermediate portions substantially parallel with the axes of the adjoining rollers, said rollers having their ends rounded and seated in the furrows of said corrugations.

5. A conical roller cage consisting of circular corrugated plates of different sizes having the furrows of the corrugations facing and adapted to receive the ends of the rollers and integral spaced partitions connecting the ridges of opposite corrugations and having intermediate portions set in from the inner edges of the plates so as to extend substantially parallel with the axes of adjoining rollers at an angle to the axis of the bearing.

6. A roller bearing comprising a circular series of conical rollers, and a cage consisting of circular corrugated plates of different sizes having the concavities or furrows of the corrugations facing the ends of the rollers, and integral rigid spaced partitions uniting the ridges of the corrugations and separating the rollers.

7. An annular roller bearing comprising a circular series of rollers and a cage consisting of circular plates of different sizes having curved or concave confronting surfaces facing the ends of the rollers, and integral spaced partitions connecting said plates and separating the rollers, the intermediate portions of said partitions being set in from the edges of the plates and extending substantially parallel with the axes of the adjoining rollers.

8. An annular roller bearing comprising a circular series of rollers and a cage consisting of circular plates of different sizes having concave surfaces facing the ends of the rollers, and integral spaced partitions separating the rollers, said partitions connecting marginal portions of said plates at an angle to the axis of the bearing and having their intermediate portions set in about midway of the outer and inner edges of said plates.

9. An annular roller bearing comprising a circular series of rollers and a cage consisting of circular plates having curved or concave confronting surfaces facing the ends of the rollers, and integral spaced partitions extending substantially parallel with the axes of adjoining rollers and holding them apart.

10. A roller cage consisting of two circular plates placed flatwise at an angle to their axes and having curved or concave confronting surfaces adapted to receive and confine therebetween rollers having rounded ends, said plates being connected by integral partitions having their ends disposed at the margins of the plates and their intermediate portions extending along the axial line of adjoining rollers about midway thereof and separating the rollers.

11. A roller cage consisting of corrugated circular plates having integral spaced connecting partitions, the furrows of the corrugations being adapted to receive and confine therebetween rollers having rounded ends, and the partitions extending along the axial line of and adapted to separate the rollers throughout the bearing.

12. A cage for confining in separated relation and permitting free rotation of a circular series of roller elements, said cage consisting of circular plates having curved or concave confronting surfaces, forming seats for rounded portions of interposed roller elements, and integral spaced partitions connecting marginal portions of said plates and serving as separators for the roller elements throughout the bearing.

13. A cage or separator for roller bearings consisting of a pair of circular plates spaced apart and connected marginally by spaced partitions, the plates being turned abruptly toward each other at their inner margins and curved slightly toward each other at their outer margins.

14. A cage or separator for roller bearings consisting of a pair of corrugated circular plates spaced apart and connected marginally by spaced partitions between the furrows of the corrugations, the plates being turned abruptly toward each other at their inner margins and curved slightly toward each other at their outer margins.

15. A cage or separator for roller bearings consisting of a pair of circular plates spaced apart and having their outer margins turned abruptly toward each other and their inner margins curved slightly toward each other, and spaced rigid partitions connecting the margins of the plates, the intermediate portions of the partitions being set in from the margins of the plates to form separators for the rollers throughout the bearings.

16. A cage or separator for roller bearings consisting of a pair of corrugated circular plates spaced apart, the furrows and ridges of the corrugations extending across the entire width of the plates and the furrows constituting seats for the ends of the rollers, and rigid partitions extending between the margins of corresponding ridges to connect the plates and having their intermediate portions disposed out of alinement with the margins of the plates whereby to engage and separate the rollers.

In testimony whereof I affix my signature, in presence of two witnesses.

DAVID FRANKLIN CHAMBERS.

Witnesses:
A. G. HERTZLER,
W. A. FULMER.